United States Patent [19]
Koeber

[11] 3,721,401
[45] March 20, 1973

[54] FILM TAKE-UP WITH RATCHET

[75] Inventor: Henry J. Koeber, Deerfield, Ill.

[73] Assignee: Bell & Howell Company, Chicago, Ill.

[22] Filed: Aug. 6, 1970

[21] Appl. No.: 61,572

[52] U.S. Cl. .................242/207, 352/168, 352/180
[51] Int. Cl. ...........................B11b 15/32, G03b 1/04
[58] Field of Search............................242/197–210; 74/194–200; 352/168, 180–182, 91, 217, 159; 95/31

[56] References Cited

UNITED STATES PATENTS

| | | | |
|---|---|---|---|
| 2,251,772 | 8/1941 | Zuber | 242/196 |
| 3,085,758 | 4/1963 | Herrmann et al. | 242/207 X |
| 3,352,169 | 11/1967 | Delin et al. | 74/194 |
| 3,084,606 | 4/1963 | Goldberg | 95/31 |

*Primary Examiner*—Leonard D. Christian
*Attorney*—William F. Pinsak, John E. Peele, Jr., Kenneth W. Greb and William K. Serp

[57] ABSTRACT

A unidirectional take-up drive mechanism of a camera of the type which accepts a film-loaded cartridge is provided with a dual path selective operable transmission whereby the take-up can be driven at a rate corresponding to film transport and at a rate slower than film transport. The dual transmission path connects the take-up with the mechanism drive to enable selection by a control of the ratio of the take-up drive to film transport rate or to slow down the rotation of the take-up so that it does not take up film as fast as the film is fed from the cartridge supply, thereby creating an excess of loosely wound film in the cartridge. The excess film may be rewound onto the supply, which film may be intentionally exposed a second time.

9 Claims, 3 Drawing Figures

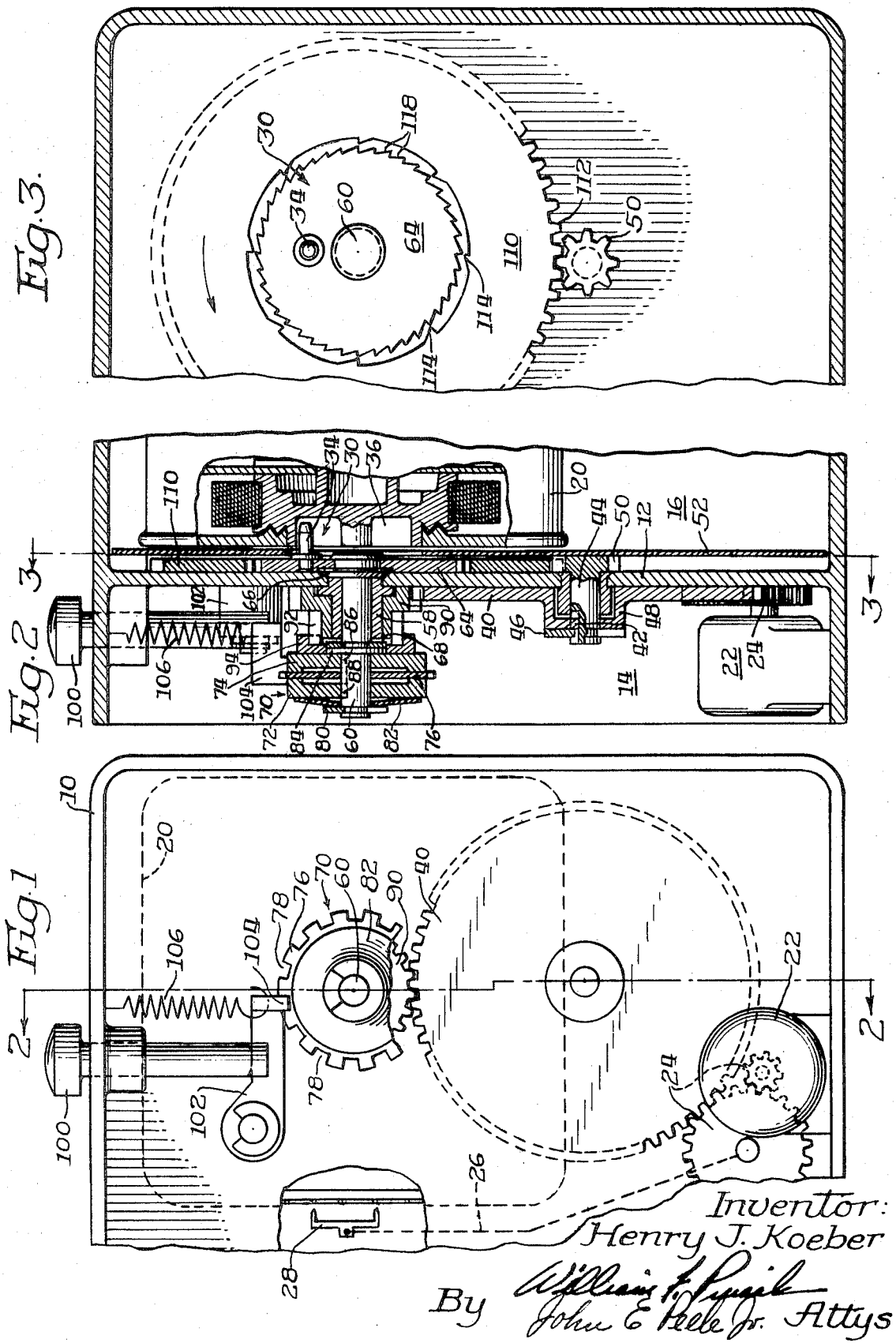

FILM TAKE-UP WITH RATCHET

This invention relates to means for making a lap dissolve with a camera having a cartridge take-up drivable in only one direction, and is particularly concerned with means for changing the speed of the take-up relative to the speed at which the film is transported from the supply in the cartridge.

Lap dissolves are made by fading out one image by gradually reducing the exposure of the film and then fading in a new image on the same portion of the film by exposing it a second time and gradually increasing the exposure until the proper exposure is reached. Although this sequence of operation is a conventional photographic technique with cameras in which the take-up reel can be reversed to rewind the partially exposed film on the supply reel, it is difficult to make a lap dissolve with cameras in which the take-up can be rotated in only one direction.

German Pat. No. 1,286,894, and U.S. Pat. No. 3,514,197 both disclose a mechanism enabling the making of a lap dissolve with a camera of the type mentioned above, but the mechanisms are complicated and cumbersome to operate. In these disclosures, the take-up is stopped in order to accumulate within the supply the required length of film to be again exposed. Hence, the film may become jammed or wedged within the supply, thereby preventing continued use of the particular supply cartridge. These structures include a manually operable blocking member to stop the take-up reel, a manually disengageable clutch, and a selectively controllable claw that controls the direction of the film travel. It is necessary to disengage the clutch and engage the blocking member to allow the once exposed film to store itself loosely in the supply cartridge. After the exposed film is rewound on the supply, it is necessary to disengage the blocking member, engage the clutch, and move the claw back to its initial position, before the normal operation of the camera can be resumed.

In the present structure, a single lever is pivoted to actuate a transmission assembly to alter the speed of the take-up drive mechanism from the normal take-up speed to a slower take-up speed. The change of the gear ratio of the take-up drive thereby slows the rotation of the take-up reel to cause an excess of partially exposed film to build up in the supply cartridge so that the film may be rewound and a lap dissolve can be made. The actuating control is released to return to its original position when the normal operation of the camera is to be resumed.

Suitable structure by means of which the above mentioned and other advantages of the invention are attained will be fully described in the following specification, taken in conjunction with the accompanying drawings showing a preferred embodiment of the invention.

In the drawings:

FIG. 1 is an elevational view of a portion of a drive mechanism embodying the invention, with portions broken away to facilitate illustration;

FIG. 2 is a sectional view of the drive mechanism taken along line 2—2 of FIG. 1; and FIG. 3 is a sectional view of the drive mechanism taken along line 3—3 of FIG. 2.

Referring to the figures, a housing 10 of a motion picture camera or the like is shown. A mechanism plate or partition 12 divides a portion of the area within the housing into a mechanism chamber 14 and a film chamber 16 in which a film cartridge 20 is insertable. Within the mechanism chamber is supported a mechanism drive motor 22 connected to a power source (not shown) and a main camera control (not shown). By a transmission, represented by gears 24 and mechanical connection 26, the motor when energized drives selected mechanisms of the camera including a film transport 28 and a film take-up drive, identified generally by reference numeral 30. By a take-up driver represented by pin 34, unidirectionally operable take-up drive 30 actuates a film take-up 36, which may also be unidirectionally operable. This film take-up is substantially concealed within film cartridge 20 and is not part of the camera mechanism. Although film transport 28 may be driven to move film F at different rates, for present considerations, the normal drive rate is intended.

For take-up assembly 30, drive of motor 22 is transmitted from the transmission 24 through plate or power input gear 40, which is mounted on and keyed at 42 to a rotatable shaft 44, and held thereon against axial movement by a retaining member shown as an E-ring 46, and mechanism plate 12. Shaft 44, supported in the mechanism plate by a bearing portion 48, has a pinion portion 50 on the cartridge chamber side of that plate which pinion is protected from interference with the cartridge by a decorator plate 52. In a not shown alternate arrangement, pinion 50 and other components within the space between mechanism plate 12 and decorator plate 52 would be within mechanism chamber 14.

A bearing 58 is also supported in mechanism plate 12 to support a take-up drive axle 60. Drive pin 34 is supported on the axle through a take-up drive disc 64 with which the pin may be integral or rigidly attached. Disc 64 is retained axially on axle 60 between rim 66, integral with the axle, and a suitable retainer, shown here as an E-ring 68. Rim 66 cooperates with bearing 58 to limit axial motion of axle 60 in the mechanism plate. The end of axle 60 away from drive pin 34 supports a friction clutch assembly 70 including a pair of friction plates 72, 74 enclosing a friction disc 76 of slightly larger diameter. About the periphery of disc 76 are arranged a plurality of cut-outs 78. A retainer ring 80 is attached to axle 60 to one side of clutch assembly 70 to hold in cooperating engagement the components of the assembly including a biasing member, shown as a disc-like spring 82. The friction between the elements of the assembly is determined by forces applied by biasing member 82 and a thrust bearing 84 keyed to axle 60 on the inner side of the assembly. Further, axle 60 is provided with a keyway 86 into which a key 88 on a friction plate 72 is seated to cause the disc and the axle to rotate together.

Coaxial with clutch assembly 70 and supported rotatably about bearing 58 is a take-up driving gear 90, which is arranged for continuous engagement with plate gear 40. When plate gear 40 is driven, take-up driving gear 90 and gear 40 define a first drive path through which drive take-up pin 34 is rotated at a rate to power cartridge take-up 36 at a normal rate of film transport. This drive is transmitted through friction plate 74 with which wing tabs 92 on gear 90 engage through axially extending abutments 94 fixed to the friction plate. Rotation of friction plate 74 causes rotation of disc 76 and thereby rotation of friction plate 72 which is keyed to axle 60 on which take-up disc 64 is mounted.

Slow down of take-up disc 64 and take-up drive pin 34 is initiated upon actuation of a control, illustrated here as a depressable button 100. The manually operable button positions a clutch de-activator 102 having a lug 104 which is movable into the next available peripheral cut-out 78 of disc plate 76. Biasing means, shown as spring 106, withdraws lug 104 upon release of control 100. When rotation of disc plate 76 is blocked by entry of lug 104 into any of the cut-outs 78, rotation of take-up driving disc 72 and pin 34 is stopped insofar as drive through driving gear 90 is concerned. That is, friction plate 74 continues to rotate but rotation of friction plate 72 and of axle 60 is prevented in that rotation of friction plate 74 is not transmitted to axle 60 since disc 76 is locked against rotation and therefore does not transmit rotation to the friction plate 72 which is keyed through shaft 60.

Rotation of the take-up assembly 30 while motor 22 is energized does not stop upon actuation of control 100, but slows to a rate wherein film is taken up at a desired ratio substantially less than normal insofar as the rate of film transport is concerned. Pinion 50, driven on shaft 44 with gear 40, is in continuous meshing engagement with a slow drive ring 110 having gear teeth 112 formed about its outer periphery and ratchet teeth 114 formed about its inner perimeter. The tips of ratchet teeth 114 have a minimum clearance relative to the tips of ratchet teeth 118 about the external periphery of take-up driving disc 64. The respective ratchet teeth 114, 118 are formed to have their cooperating driving surfaces arranged so that faster rotation of disc 64 causes ratchet teeth 118 to pass over ratchet teeth 114, and to cause the ratchet teeth 114 to drivingly engage the ratchet teeth 118 when slow drive ring 110 rotates faster than disc 64. The free rotation or ratcheting of ratchet teeth 114 relative to teeth 118 is enabled by the support of slow drive ring 110 in a substantially free-floating manner. The faces of ratchet teeth 114 and 118 are so designed as to cooperate in a manner which enables relative sliding movement between the teeth because ring 110 is seated with sufficient axial play to permit it to shift slightly to enable teeth 118 to move free of respective tooth 114 when disc 64 moves relatively counter-clockwise as seen in FIG. 3, yet, to cause positive engagement between the teeth when ring 110 moves counter-clockwise relative to disc 64. The latter operating mode results due to slight overlapping of the teeth occuring when ring 110 is responsive to pinion 50 which causes lifting of the ring. Thus, the teeth 114 of ring 110 are caused to engage and maintain engagement with teeth 118 as the ring rotates relatively faster than the ratchet disc when that disc is locked. By the interaction of slow drive ring 110 and disc 64 during camera operation and when clutch assembly 70 is locked, take-up driver 34 is driven through this second drive path at a slower than normal rate relative to a determined film transport rate than when driven through the first drive path.

Summarizing operation of the dual-speed assembly, the camera has a motor connected operatively to power a film take-up and other components including a film transport. For normal film transport and take-up operations, the take-up is driven through a clutch assembly which permits driving of the take-up to remove film at substantially the same rate as film is transported toward that take-up. To cause a supply of film to be available for rewinding and a second exposure notwithstanding the unidirectionally rotatable take-up drive, a control is operable to disengage the clutch of the take-up drive assembly. Disengaging of the clutch overrides the drive for normal rate film take-up and permits a secondary drive to power the take-up. The secondary or slower drive causes film to be taken up at a small fraction of the rate of film transport. Hence, a length of exposed film is free in the take-up chamber and can be rewound and again exposed.

What is claimed is:

1. In a camera having motive means for driving a film transport at a predetermined rate and a unidirectionally operable film take-up driven through transmission means arranged between said motive means and said take-up for driving said take-up at a first rate corresponding to a film transport rate and at a second rate slower than the film transport rate, the improvement comprising:
   a clutch assembly in said transmission means permitting driving the take-up at a rate corresponding to a film transport rate; and
   control means operable to disengage said transmission means by actuation of said clutch assembly thereby enabling drive of said take-up at a rate substantially slower than the film transport rate.

2. A camera as in claim 1, wherein said transmission means includes first and second drive transmission paths and a drivable shaft supporting said clutch assembly in operative connection with said take-up, said shaft being drivable through said first drive transmission path when said clutch is engaged and through said second drive transmission path when said clutch is disengaged.

3. A camera as in claim 1 wherein said transmission means includes first and second drive transmission paths and a driver member connectable in said first drive transmission path and said second drive transmission path, through said transmission means, means selectively connecting said motive means through said first drive transmission path for rotation of said driver member at a first rate and for disconnecting means of said first drive transmission path and connecting means of said second drive transmission path for rotation of said driver member at a second rate.

4. A camera as in claim 3, wherein said driver member is fixed to a drivable shaft supporting said clutch assembly, said shaft being drivable through said first drive path when said clutch is engaged and through said second drive path when said clutch is disengaged.

5. A camera as in claim 1, wherein said take-up cooperates with a surrounding drive ring for selective drive and comprises:
   a take-up engaging member;
   an axially mounted disc supporting said take-up member;
   a ring-like member surrounding said disc and having internally arranged ratchet members thereon;

ratchet tooth means formed about the periphery of said disc for overriding action relative to cooperating ratchet members of said ring-like member when said disc is driven faster than said ring-like member; and said ratchet tooth means being engageable for driving of said disc when said ring is driven faster than said disc.

6. A camera as in claim 5, wherein said ring-like member is supported for substantially free-floating action.

7. A camera including a motive means for driving a film transport at a predetermined speed and for driving a two-speed film take-up, comprising:
 a transmission having first and second drive transmitting paths;
 a clutch assembly having an input member and an output member;
 means cooperating with said first drive path to drive said input member of said clutch assembly;
 means operable to drive said output member of said clutch assembly by said input member;
 control means operable to selectively lock said last named means to prevent drive of said output member;
 take-up drive means;
 connecting means to drive said drive means when said clutch output member is driven through said first drive path; and
 means cooperating with said second drive path to drive said take-up drive member when said clutch output is locked in response to actuation of said control means.

8. In a camera having motive means for driving a film transport at a predetermined rate and a unidirectionally operable film take-up driven by said motive means and said take-up for driving said take-up at a first rate corresponding to a film transport rate and at a second rate slower than the film transport rate, the improvement comprising: a transmission means,
 a first portion of said transmission means permitting driving the take-up at a rate corresponding to a film transport rate; and
 control means operable to override said first portion of said transmission means and to enable a second portion of said transmission means to drive said take-up at a rate substantially slower than the film transport rate.

9. A camera as in claim 8 wherein said first and second portions of said transmission means form first and second drive transmission paths, and said transmission means includes a drivable shaft in operative connection with said take-up, said shaft being drivable at the first rate through said first drive transmission path and, at the second rate through said second transmission drive path.

* * * * *